United States Patent [19]
Hartmann

[11] 3,897,929
[45] Aug. 5, 1975

[54] RECESSED SPRUE BUSHING FOR A THREE-PLATE MOLD SET

[75] Inventor: James H. Hartmann, Northbrook, Ill.

[73] Assignee: National Tool and Manufacturing Co., Kenilworth, N.J.

[22] Filed: Aug. 12, 1974

[21] Appl. No.: 496,919

[52] U.S. Cl............ 249/105; 249/67; 425/242 R; 425/443; 425/DIG. 51
[51] Int. Cl.² ............ B28B 7/10; B29F 1/14
[58] Field of Search. 425/242 R, 247, 443, DIG. 51, 425/192; 249/67, 68, 105; 164/303

[56] References Cited
UNITED STATES PATENTS

| 3,645,492 | 2/1972 | Edlis | 249/68 |
| 3,695,572 | 10/1972 | Jullien-Davin | 249/68 |
| 3,724,802 | 4/1973 | Veneria | 425/443 X |
| 3,740,179 | 6/1973 | Schmidt | 425/192 |

Primary Examiner—Robert D. Baldwin
Attorney, Agent, or Firm—Ralph R. Roberts

[57] ABSTRACT

A sprue bushing for mold sets is described for use with injection molds employing three plates to permit easy stripping of runners and sprue portions from products molded therein. This nozzle sprue bushing is adapted to receive an injection nozzle while mounted in a first or top plate. This sprue bushing has an extending portion which mates and seats in a tapered recess in a second bushing carried by the second or stripper plate. The nozzle sprue bushing has a sprue passageway which terminates at the top plate of the mold. The extension nozzle of the injection press seats within a radiused portion formed in the recessed sprue bushing. The extension of the sprue bushing which seats in the runner plate bushing is preferably exactly the length of the stripper or runner plate bushing which is carried in the runner or stripper plate of a tri-plate mold set. The sprue is very short and, as reduced to practice, remains with the runner sprue which is usually separated from the molded piece during removal of the molded unit from the mold cavity.

8 Claims, 4 Drawing Figures

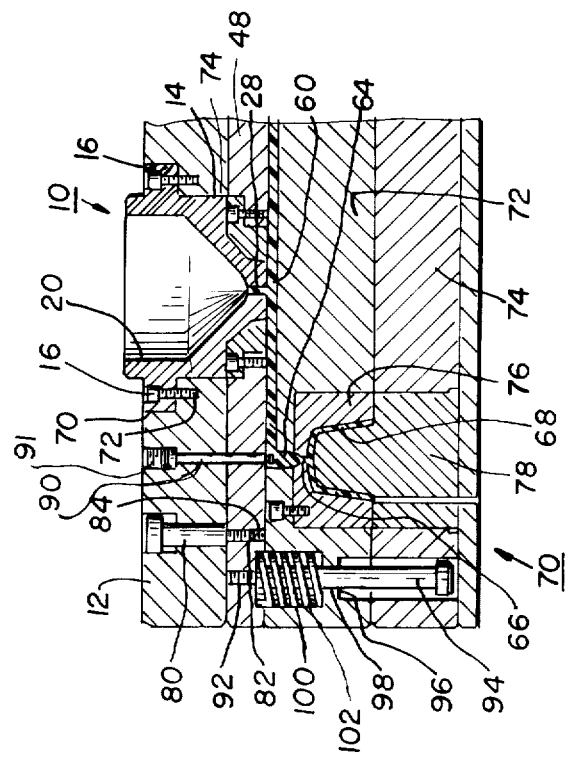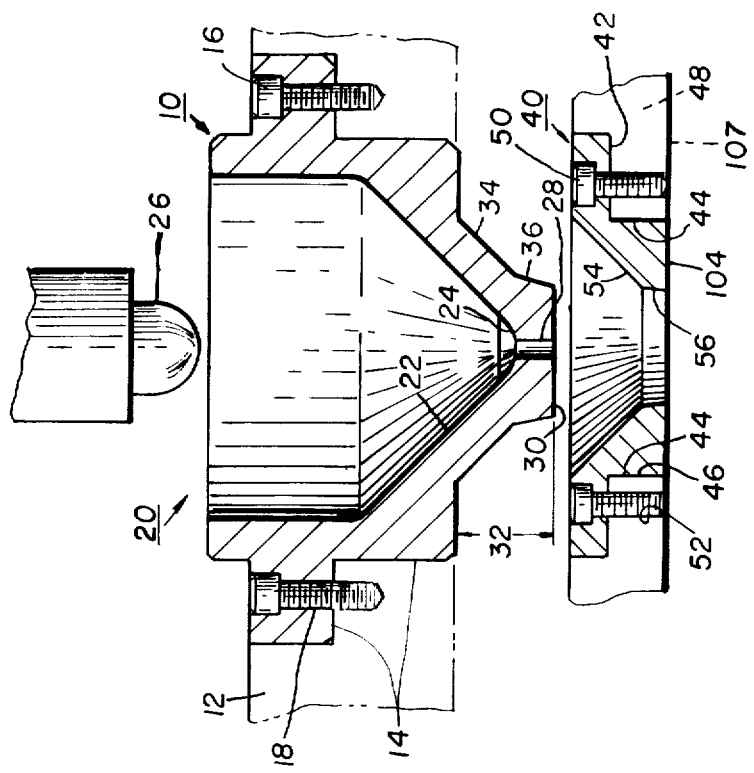

RECESSED SPRUE BUSHING FOR A THREE-PLATE MOLD SET

BACKGROUND OF THE INVENTION

Description of the Prior Art

Presses for the molding of rubber, plastic and the like and the molds used therewith are, of course, well known. In particular the development of the many plastics now available for molding has, in many instances, enabled molded parts made by injection molding techniques to be made in molds which have self-stripping or substantially self-stripping sprues and runners. Patents directed toward sprue bushings include a multipart injection molding die as seen in U.S. Pat. No. 3,740,179 issued to Schmidt on June 19, 1973 wherein the technique of injection molding of large units is disclosed. Disclosed with this mold is a recessed sprue bushing, however, the tapered fit and aligning means provided by the sprue bushing assembly of the present invention is neither shown nor suggested. Also known is U.S. Pat. No. 3,724,802 as issued to Veneria on Apr. 3, 1973. This patent pertains to a set for molding plastic wherein a sprue bushing also passes through a stripper plate but no secondary bushing in the stripper plate is suggested or disclosed. In these and other known molding processes and apparatus there have been many attempts to form the sprue so as to result in a very short length and to provide a means for self-stripping the sprue and associated runners. The present invention provides such a sprue bushing having a very short sprue passageway and by employing a two-piece recessed sprue bushing unit forms a short sprue while at the same time enabling a stripping of the sprue and runner.

SUMMARY OF THE INVENTION

This invention may be summarized at least in part with reference to its objects.

It is an object of this invention to provide, and it does provide, a sprue bushing for tri-plate mold sets in which the bushing is mounted in the first plate and has an extending portion exactly the thickness of the second or stripper plate. Mounted in this stripper plate and in precise alignment with the sprue bushing is a stripper plate bushing which has a tapered recess sized to precisely receive and retain a mating taper formed on the extending exterior of the sprue bushing.

It is a further object of this invention to provide, and it does provide, a sprue bushing for a tri-plate mold set in which a sprue bushing has a short sprue passageway formed therethrough, one end of this passageway terminating at the mold side surface of the stripper plate while the other end is more-or-less centrally located at the bottom or innermost portion of a deep formed spherical cavity sized to receive the forward end of an injection nozzle. An extending portion of the sprue bushing protrudes the exact thickness of the stripper plate and the outer surface is formed with a tapered portion which is precisely formed so as to seat in a like tapered recess in a stripper plate bushing mounted in a shouldered recess in the stripper plate.

With a tri-plate mold set for injection molding the present invention provides an extension sprue bushing having a tapered receiving socket for an extension nozzle. A short sprue passageway leads to an outlet surface which, in the "mold closed" condition, terminates at the mold side of the stripper plate. To insure a repeated precise positioning of the sprue bushing in the stripper plate and a positive seal of this bushing to prevent unwanted loss of molten material a stripper plate bushing is secured in and moves with this plate. The stripper plate bushing provides a positive sealing and aligning means for the recessed sprue bushing but does not, of itself, have a molten sprue passageway.

In addition to the above summary the following disclosure is detailed to insure adequacy and aid in understanding of the invention. This disclosure, however, is not intended to prejudice that purpose of a patent which is to cover each new inventive concept no matter how it may later be disguised by variations in form.

For this reason there has been chosen a specific embodiment of the recessed sprue bushing for a three-plate mold set as adopted for use in plastic molding and the like and showing a preferred embodiment which has been chosen for the purposes of illustration and description as shown in the accompanying drawing wherein:

BRIEF DESCRIPTION OF THE DRAWINGS

FIG. 1 represents an exploded sectional view of the components comprising the recessed sprue bushing for use with a tri-plate mold set, the components are shown in an exploded arrangement and prior to the closing of an associated mold;

FIG. 2 represents a sectional view in a similar scale of the sprue bushing of FIG. 1 but mounted in and with the mold set closed for a typical injection of plastic into the mold;

In the following description and in the claims various details are identified by specific names for convenience and these names are intended to be generic in their application. Corresponding reference characters refer to like members throughout the four figures of the drawings.

Figure 4:
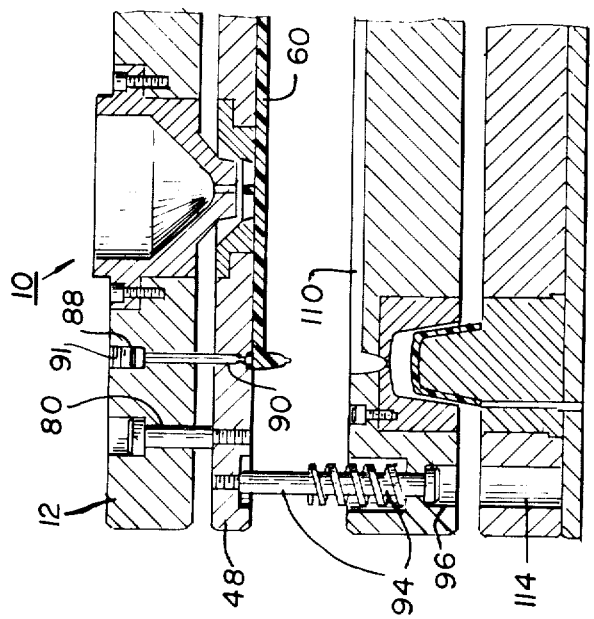
FIG. 4 represents a sectional view of the tri-plate arrangement of FIG. 3 with the mold and tri-plate set in full open condition, and showing the stripping of the mold runner prior to or at the point of removal from the mold.

The drawings accompanying, and forming part of, this specification disclose certain details of construction for the purpose of explanation of the broader aspects of the invention, but it should be understood that such structural details as are shown and described may be modified without departure from the concept of the invention.

DESCRIPTION OF THE PREFERRED EMBODIMENT

Referring now to drawings, there is depicted in FIG. 1 a recessed sprue bushing 10 adapted for mounting in a first or upper plate 12. In a preselected position in and through this plate is formed a shouldered recess 14 in which is mounted the sprue bushing 10. This sprue bushing is retained in this shouldered or stepped recess by means of socket head cap screws 16 which are rotatably seated in counterbore holes 18 formed in the flange portion of the sprue bushing. A plurality of such socket headed screws retain the sprue bushing in a fixed relation in the recess 14. This sprue bushing as depicted has a cavity 20 which at its lower end is formed with a taper 22 to provide a conical recess which terminates at a determined radiused socket end 24. This radius is established to conform precisely to the radiused end of an extension nozzle 26 of an injection press, not shown. In the midportion of this radius socket portion 24 there is a short sprue passageway 28 which is formed with a slight expanding taper to permit ready removal from the mold. This tapered sprue passageway begins the slight taper at the radius socket portion 24 and expands to a slightly larger diameter at the terminating lower discharge end 30 of the sprue bushing 10.

It is to be noted that the sprue bushing extends below the upper plate 12 a selected distance. This distance is indicated as a dimension 32 in FIG. 1. This dimension or distance, as reduced to practice, is approximately seven-eighths of an inch and is held to a fairly reasonable close tolerance for reasons to be hereinafter discussed. This extended portion has a tapered section 34 which may be approximately ninety degrees included angle. This taper is terminated at another tapered portion 36 which taper is approximately 15° from the vertical or center line resulting in an included angle of approximately 30°. This angle and extent is precisely maintained for a purpose to be hereinafter more fully described.

A companion member for sprue bushing 10 is a stripper plate bushing generally identified as 40 and having a flange portion 42 of determined diameter and thickness which, for example, may be approximately three-eighths of an inch. A lower diameter portion 44 is precisely formed to provide a snug fit into a like sized shouldered bore 46 formed in a stripper plate 48. In FIG. 1, a plurality of cap screws 50 are depicted as passing through counterbored holes in this flange and into threaded holes 52 in plate 48 to retain this stripper plate bushing in said plate. This stripper plate bushing 40 in mounted condition is precisely aligned with the nozzle sprue bushing 10 so that in a "mold closed" condition the tapered portion 36 of the sprue bushing precisely seats in and engages like formed tapered portion 56 in the stripper plate bushing 40. In the "mold closed" condition as seen in FIG. 2, the extension sprue bushing taper 36 seats in taper socket 56 to form a unitary assembly which is sufficiently tight so as to prevent any back flow of a runner 60 of molten plastic as it is fed under high pressure from the sprue passageway 28. From this sprue the molten plastic flows to cavity sprue portion 64 and reduced gates 66 into the cavity 68 of a mold 70. The upper mold half is carried in a third or upper mold plate 72, which mold plate mates with and is aligned by suitable pin means, not shown, with the center or retaining plate portion 74 of the mold. Shown are conventionally made upper mold portion 76 and core portion 78.

As seen in FIG. 2, the nozzle sprue bushing 10 is retained in the first or upper plate 12 by means of the short cap screws 16 which pass through the flange portion 70 of the sprue bushing into appropriately tapped holes 72 in this plate. The precise positioning of the sprue bushing in the plate is maintained by a close fit of the lower diameter portion 74 in bore 14 which may be 3 15/16 inches. In such a sized bushing the larger upper diameter portion 76 is approximately 5½ inches and is precisely made to mate with a like sized upper bore in the upper plate. This mating of diameters and bores precisely positions the nozzle sprue bushing 10 in this first plate 12. The second plate 48 is limited in its relative motion of the first plate 12 by appropriately positioned shoulder screws 80 whose threaded ends are secured in tapped holes 84. The shanks of these shoulder screws are slidable in conterbored holes formed in the upper plate. A plurality of these screws position the runner plate in precise alignment with the upper top plate.

Also carried in counterbored holes 88 in the upper plate and slidable in aligned holes in the runner plate are sucker pins 90. Plugs 91 secure these sucker pins longitudinally in plate 12. The placing and number of these sucker pins is a matter of selection and depends largely on the number of runners needed to adequately feed the molten material to the mold cavity. Also mounted in threaded holes 92 formed in the stripper plate 48 are a determined number of stripper bolts 94. The heads of these bolts are slidably carried in conterbores 96 formed in the lower surface portion of the upper mold plate 72. A reduced diameter bore 98 above the counterbore slidably retains the shank of these stripper bolts 94. An upper counterbore 100 formed in the upper surface of plate 72 provides a recess in which a spring 102 is carried. If desired, a seating recess 106 for the upper end of spring 102 may be formed in the lower surface of stripper plate 48.

USE AND OPERATION

Figure 3:
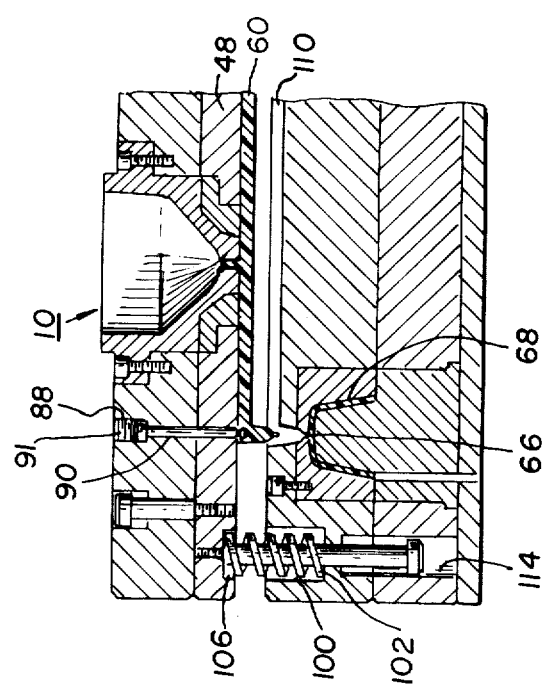
FIG. 3 represents a sectional view similar in scale to that of FIG. 2 and with the press moved to a partly open condition, the die springs are arranged to cause the first and second plates to be held in a contiguous relationship while the sprue and associated runners have been pulled from their connection to the molded product, the runner paths, the sprue bushing and mold sprues.

Referring now in particular to the FIGS. 2, 3 and 4, it is to be noted that the nozzle sprue bushing 10 in mounted condition in plate 12 precisely mates with the stripper plate bushing 40 so that the like sized male and female 30° taper portions precisely engage when the plates are in a "mold closed" condition as in FIG. 2. In FIG. 2, the lower extending end 30 of the nozzle sprue bushing and the lower surface 107 of the stripper plate bushing is precisely aligned with the lower surface of stripper plate 48. To avoid any loss of molten material there is no appreciable gap between the taper 36 of the nozzle sprue bushing and tapered socket 56 in the stripper plate bushing. Conventionally formed in the third or top mold plate are appropriately positioned sprue runners 110 which extend from the sprue opening 28 in the nozzle sprue bushing to cavity sprues 64 formed in this mold plate. These cavity sprues terminate in short gates 66 passing into the cavity 68 of the mold.

The stripper bolts 94 may have their heads freely passable into a bore 114 in the lower mold plate 74. This bore, more-or-less, aligns with bore 96 in the top mold plate 72. In the "mold closed" condition spring 102 is compressed a determined amount in the spring recess 100 and 106 of plates 72 and 48. While the mold is in the closed condition the extension nozzle 26 is brought into the radiused recess 24 which may conventionally be a half inch or a three-quarter inch spherical radius depending on the commercial injection unit with which it is associated. The molten plastic is ejected from this nozzle 26 and flows through the tapered sprue opening 28 and into the runners 110. This molten plastic then flows through the several cavity sprues 64 and then through gates 66 into the cavity 68 of the closed mold. After the appropriate cooling time has passed the press is then opened in the conventional manner. Springs 102 cause the stripper plate 48 to lift with and as the upper plate 12 is being lifted. These several springs insure that the runner plate is carried upwardly as in FIG. 3 with the movement of the upper plate. The sucker pins 90 carry the runner 60, the cavity sprue 64 and cause the gate 66 to be pulled from the mold 68. Further opening of the mold proceeds as in FIG. 4 wherein the heads of stripper bolts 94 engage the shoulder of the bore 96 to cause the stripper plate 48 to be separated from the top plate 12. Screws 80 carry the stripper plate 48 and lift the upper mold 76 from the lower mold plate 74. The stripper plate bushing is moved downwardly from the sprue bushing causing the sprue to be pulled from passageway 28 and the runners 60 to be lifted from the mold. Near the upper limit of movement of the top plate 12 the heads of the sucker pins are engaged to cause them to be pulled from the runners thus allowing the runners and sprue to be discharged from the mold. The molded member is now conventionally removed from the mold.

Although specific sizes have been above-noted this is merely by way of example of a reduction to practice. Establishment of a specific size permits mass production techniques and precision tolerances since it is considered highly desirable that both the nozzle sprue bushing and the stripper plate bushing be hardened and ground for durable service and the precision fit desired to prevent leaks of molten plastic. The placement and use of sucker pins 90 and the stripper bolts 94 and associated springs 102 are selected from stock sizes depending on the thickness and size of the mold item.

Terms such as "left," "right," "up," "down," "bottom," "top," "front," "back," "in," "out" and the like are applicable to the embodiment shown and described in conjunction with the drawings. These terms are merely for the purposes of description and do not necessarily apply to the position in which the recessed sprue bushing may be constructed or used. It is to be understood the invention is not limited to the specific showing since modifications may be made within the scope of the accompanying claims and protection is sought to the broadest extent the prior art allows.

What is claimed is:

1. In a tri-plate mold set as used in injection molding by and in a press using an extending sprue, said tri-plate mold set including a top plate which is associated with and aligned with a stripper plate by appropriate lost motion and guide means, said stripper plate also associated with a first mold plate and having aligning means and a lift means by which said first mold plate is lifted by the stripper plate at a determined time period during the mold opening action by the press mechanism after termination of the injection molding cycle and for use with this mold set a sprue bushing improvement including: (a) a recessed sprue bushing having a through sprue passageway and having its outer surface formed and sized for a compatible mounting in a precisely formed through aperture in a top plate of a three-plate mold set and including means for securing this bushing at a fixed position in the top plate, said bushing having a sprue receiving cavity which is formed with its inner and lower end at a selected taper providing a conical recess terminating at a spherically radiused socket, said sprue bushing having a lower portion which extends beyond the lower surface of the top plate in which it is to be mounted, said extending portion having at least its lower outer surface formed with a precise taper, and (b) a stripper plate bushing sized for a compatible and fixed mounting in a precisely formed through aperture in a stripper plate associated and aligned with said top plate, said stripper plate bushing including means for securing this bushing in a position in the stripper plate so that the axis of the stripper plate bushing and the recessed sprue bushing are in coincidence, said stripper plate bushing having a tapered aperture therethrough, this aperture having at least its lower portion sized for precisely receiving and engaging the precisely formed lower tapered extending end portion of the sprue bushing and when the top plate and the stripper plate are brought into a contiguous relationship the tapered end of the extending portion of the sprue bushing engages the receiving taper to provide a molten plastic shut-off at the lower surface of the sprue bushing and the stripper plate bushing.

2. A recessed sprue bushing in combination with a stripper plate bushing as in claim 1 and further including forming the spherical radius portion in the sprue bushing with a one-half inch radius.

3. A recessed sprue bushing in combination with a stripper plate bushing as in claim 1 and further including forming the spherical radius portion in the sprue bushing with a three-quarter inch radius.

4. A recessed sprue bushing in combination with a stripper plate bushing as in claim 1 and further including forming the stripper plate bushing so that when mounted in the stripper plate the underside surface of this bushing toward the first mold cavity plate is flush with the underside surface of the stripper plate.

5. A recessed sprue bushing in combination with a stripper plate bushing as in claim 4 which further includes forming the underside surface of the extension portion of the sprue bushing so that in a fully seated condition in the stripper plate bushing, said underside surface of the sprue bushing is also flush with the undersurface of the stripper plate.

6. A recessed sprue bushing in combination with a stripper plate bushing as in claim 1 which further includes forming the lower exterior taper of the extending portion of the sprue bushing and the mating taper recess in the stripper plate bushing with a 30° included angle.

7. A recessed sprue bushing in combination with a stripper plate bushing as in claim 1 which further includes forming both the recessed sprue bushing and the stripper plate bushing with flange portions adapted to seat in counterbored portions formed in the associated die set plates in which the bushing is mounted.

8. A recessed sprue bushing in combination with a stripper plate bushing as in claim 1 which further includes making both bushings of heat treated and treatable steel.

* * * * *